US008383728B2

(12) United States Patent
Brenner et al.

(10) Patent No.: US 8,383,728 B2
(45) Date of Patent: *Feb. 26, 2013

(54) ADHESIVES BASED ON POLYESTER-GRAFT-POLY(METH)ACRYLATE COPOLYMERS

(75) Inventors: Gabriele Brenner, Duelmen (DE); Rene Koschabek, Mannheim (DE); Sven Balk, Frankfurt (DE); Thorsten Brand, Marl (DE); Gerd Loehden, Essen (DE)

(73) Assignee: Evonik Degussa GmbH, Essen (DE)

( * ) Notice: Subject to any disclaimer, the term of this patent is extended or adjusted under 35 U.S.C. 154(b) by 273 days.

This patent is subject to a terminal disclaimer.

(21) Appl. No.: 12/673,348

(22) PCT Filed: May 29, 2008

(86) PCT No.: PCT/EP2008/056581
§ 371 (c)(1),
(2), (4) Date: Feb. 12, 2010

(87) PCT Pub. No.: WO2009/022218
PCT Pub. Date: Feb. 19, 2009

(65) Prior Publication Data
US 2011/0196087 A1 Aug. 11, 2011

(30) Foreign Application Priority Data
Aug. 16, 2007 (DE) .......................... 10 2007 038 807

(51) Int. Cl.
*C08L 33/02* (2006.01)
*C08L 51/00* (2006.01)

(52) U.S. Cl. ............... 525/78; 525/80; 525/86; 524/504
(58) Field of Classification Search .................. 524/504; 525/78, 80, 86
See application file for complete search history.

(56) References Cited

U.S. PATENT DOCUMENTS

| 8,106,129 B2 | 1/2012 | Balk et al. |
| 2008/0057205 A1 | 3/2008 | Lohden et al. |
| 2008/0292893 A1 | 11/2008 | Loehden et al. |
| 2009/0048401 A1 * | 2/2009 | Loehden et al. ............... 525/221 |

FOREIGN PATENT DOCUMENTS

| CN | 1430657 A | 7/2003 |
| EP | 0542 105 | 5/1993 |
| WO | WO 01/90265 A1 | 11/2001 |
| WO | 03 010256 | 2/2003 |
| WO | 2007 098819 | 9/2007 |

OTHER PUBLICATIONS

U.S. Appl. No. 12/992,184, filed Nov. 11, 2010, Koschabek, et al.
US 8,084,136 Patent Family Search printed Sep. 6, 2012.
US 8,053,522 Patent Family Search printed Sep. 6, 2012.
U.S. Appl. No. 13/513,997, filed Jun. 5, 2012, Brand, et al.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

The present invention relates to the use of mixtures comprising polymer types A, B and AB as or in adhesives, polymer type A being a copolyester prepared with cocondensation of unsaturated aliphatic dicarboxylic acids, polymer type B being a (meth)acrylate homopolymer and/or copolymer, and polymer type AB being a graft copolymer of polymer type A and polymer type B.

15 Claims, No Drawings

ADHESIVES BASED ON POLYESTER-GRAFT-POLY(METH)ACRYLATE COPOLYMERS

The present invention relates to the use of mixtures comprising polymer types A, B and AB as or in adhesives, polymer type A being a copolyester prepared with cocondensation of unsaturated aliphatic dicarboxylic acids, polymer type B being a (meth)acrylate homopolymer and/or copolymer, and polymer type AB being a graft copolymer of polymer type A and polymer type B.

Reactive hotmelt adhesives are substances which are solid at room temperature. They are melted by heating and applied to the substrates to be joined. On cooling, the adhesives resolidify and thus bind the substrates. Additionally the polymers present in the adhesive crosslink by reaction with moisture, resulting in an ultimate, irreversible curing.

For numerous applications, such as that of surface lamination in the production of sandwich elements, for example, it is necessary for the reactive hotmelt adhesive to have a long open time, in order to allow the adherends to be joined. The open time is understood to be the period of time within which the adhesive can be processed. At the same time the adhesive should set rapidly following application and develop sufficient initial strength to allow immediate further processing. The bondline ought to be very highly elastic. After curing, the cohesion, thermal stability and solvent resistance ought to be very high. This represents a problem with the existing reactive hotmelt adhesives.

Reactive hotmelt adhesives are described for example by H. F. Huber and H. Müller in the article "Shaping Reactive Hotmelts Using LMW Copolyesters" in Adhesives Age, November 1987, pages 32-35. They are composed of combinations of amorphous and crystalline polyesters and their reaction products with isocyanates.

DE 38 27 224 describes moisture-curing, isocyanate-functional hotmelt adhesives with a particularly high setting rate, their polyester backbone preferably being purely aliphatic and containing from at least 12 up to a maximum of 26 methylene groups in the repeating unit formed from diol and dicarboxylic acids, dicarboxylic acids having 8-12 methylene groups being used. The high setting rate correlates with a short open time.

U.S. Pat. No. 5,021,507 mixes urethane prepolymers with non-functionalized polymers formed from ethylenically unsaturated monomers, in order to improve the initial strength and adhesion properties. Polymers used are typically polyalkyl(meth)acrylates with $C_1$ to $C_{12}$ alkyl groups. These polymers are polymerized by free-radical polymerization from the corresponding monomers either before addition to the urethane prepolymers or in the presence of said prepolymers. Since the polyalkyl (meth)acrylates do not undergo chemical crosslinking, the heat resistance and solvent resistance of the adhesive is inadequate.

U.S. Pat. No. 5,866,656 and WO 99/28363 describe solvent-free, moisture-curing polyurethane adhesives which are solid at room temperature, consisting of a reaction product of a polyisocyanate and a low molecular weight polymer of ethylenically unsaturated monomers, the polymer carrying active hydrogen atoms, and also at least one polyurethane prepolymer with free isocyanate groups, prepared from at least one polyol and a polyisocyanate. The polyol may be a polyether diol, polyether triol, polyester polyol, aromatic polyol or mixture thereof. The low molecular weight polymer of ethylenically unsaturated monomers is a poly(meth)acrylate which is prepared by free-radical polymerization. The typical composition consists of polypropylene glycol, hydroxyl-containing poly(meth)acrylate, diphenylmethane 4,4'-diisocyanate and polyester diol. The resulting reactive adhesives are distinguished over those from U.S. Pat. No. 5,021,507 by a longer open time and an improved adhesion to metals and to fluorinated polyethylene or unplasticized PVC. Although the extractable fraction in the cured adhesives is reduced, it is still very high. This has the effect, among others, of reducing the solvent resistance and temperature stability of the adhesives. A further disadvantage of these adhesives is the risk of gelling of the polyalkyl(meth)acrylates with OH or NH functionality on reaction with isocyanates. Moreover, these adhesives lack adequate stability of viscosity in the melt at 130° C., thereby making processing more difficult. A further problem is the high level of polyether polyols such as polypropylene glycol. Although polypropylene glycol increases the elasticity of the adhesive and acts as a compatibilizer between polyalkyl(meth)acrylates and polyester diols, polyether polyols nevertheless have disadvantages in terms of oxidation stability and thermal stability, and reduce the initial strength and cohesion.

EP 1 678 235 describes reactive hotmelt adhesives comprising poly(meth)acrylates with hydroxyl groups and/or amino groups and/or mercapto groups that have a polydispersity D of less than 1.8 and are prepared by anionic polymerization, RAFT or ATRP. The reactive hotmelt adhesives have improved properties relative to the adhesives disclosed in U.S. Pat. No. 5,866,656 and WO 99/28363, in relation to processing stability, tensile shear strength and solvent resistance. The polymerization and working-up of the narrowly distributed polyalkyl(meth)acrylates, however, is very complicated.

The object was therefore to develop improved compositions suitable for use as adhesives, more particularly as hotmelt adhesives. The raw materials used for the hotmelt adhesives ought to be easily and inexpensively available. Improved compatibility between the individual polymer components, especially polyacrylates and polyesters, is desirable for trouble-free application. Surprisingly this object is achieved through the use of specific polymer mixtures in adhesives, and the provision of an adhesive, in accordance with the claims.

The present invention first provides, accordingly, the use of mixtures comprising polymer types A, B and AB as or in adhesives, polymer type A being a copolyester prepared with cocondensation of unsaturated aliphatic dicarboxylic acids, polymer type B being a (meth)acrylate homopolymer and/or copolymer, and polymer type AB being a graft copolymer of polymer type A and polymer type B.

Polymer Type A

As polymer type A use is made in accordance with the invention of copolyesters distinguished by unsaturated aliphatic dicarboxylic acids as a monomer unit. The copolyesters in the sense of the invention have a linear or branched structure and are characterized by OH numbers of 5 to 150 mg KOH/g, preferably of 10 to 70 mg KOH/g acid numbers of below 10 mg KOH/g, preferably below 5 mg KOH/g and more preferably below 2 mg KOH/g a number-average molecular weight of 700-25 000 g/mol, preferably 2000-12 000 g/mol.

The hydroxyl number (OH number) is determined in accordance with DIN 53240-2. In that method the sample is reacted with acetic anhydride in the presence of 4-dimethylaminopyridine as catalyst, the hydroxyl groups being acetylated. For each hydroxyl group this produces one molecule of acetic acid, whereas the subsequent hydrolysis of the excess acetic anhydride gives two molecules of acetic acid. The consumption of acetic acid is determined by titrimetry from the difference between the main value and a control value, which is carried out in parallel.

The acid number is determined in accordance with DIN EN ISO 2114. The acid number (AN) is understood as the amount of potassium hydroxide in mg that is needed to neutralize the acids present in one gram of substance. The sample under analysis is dissolved in dichloromethane and titrated with 0.1 N methanolic potassium hydroxide solution against phenolphthalein.

The molecular weight is determined by means of gel permeation chromatography (GPC). The samples are characterized in tetrahydrofuran as eluent in accordance with DIN 55672-1.

$M_n$ (UV)=number-average molar weight (GPC, UV detection), reported in g/mol $M_w$ (UV)=mass-average molar weight (GPC, UV detection), reported in g/mol The amount of unsaturated aliphatic dicarboxylic acids in the copolyesters of the invention is situated in the range between 0.1 mol % and 20 mol %, preferably between 1 mol % and 10 mol % and very preferably between 2 mol % and 8 mol %, based on the total amount of polycarboxylic acids used. Otherwise the nature of the polycarboxylic acids used for the copolyesters is arbitrary. Thus it is possible for aliphatic and/or cycloaliphatic and/or aromatic polycarboxylic acids and/or dimer fatty acids to be present. Polycarboxylic acids are compounds which carry preferably more than one, and with particular preference two, carboxyl group(s); in particular embodiments, in deviation from the general definition, the term also encompasses monocarboxylic acids.

Examples of unsaturated aliphatic dicarboxylic acids are fumaric acid, maleic acid, itaconic acid and esterifiable derivatives thereof.

In one particularly preferred embodiment the unsaturated aliphatic dicarboxylic acid is itaconic acid.

Examples of aliphatic polycarboxylic acids are succinic acid, glutaric acid, adipic acid, pimelic acid, azelaic acid, sebacic acid, undecanedioic acid, dodecanedioic acid, tridecanedioic acid, tetradecanedioic acid, octadecanedioic acid. Examples of cycloaliphatic polycarboxylic acids are the isomers of cyclohexanedicarboxylic acid. Examples of aromatic polycarboxylic acids are the isomers of benzenedicarboxylic acid and trimellitic acid. Instead of the free polycarboxylic acids it is also possible, if desired, to use their esterifiable derivatives, such as corresponding lower alkyl esters or cyclic anhydrides, for example.

The nature of the polyols used for the copolyesters of the invention is arbitrary. Thus it is possible for aliphatic and/or cycloaliphatic and/or aromatic polyols to be present. Polyols are compounds which carry preferably more than one, and with particular preference two, hydroxyl group(s); in particular embodiments, in deviation from the general definition, the term also encompasses monohydroxy compounds.

Examples of polyols are ethylene glycol, propane-1,2-diol, propane-1,3-diol, butane-1,4-diol, pentane-1,5-diol, hexane-1,6-diol, octane-1,8-diol, nonane-1,9-diol, dodecane-1,12-diol, neopentyl glycol, butylethyl-propane-1,3-diol, methyl-propane-1,3-diol, methyl-pentanediols, cyclohexanedimethanols, trimethylol-propane, pentaerythritol and mixtures thereof.

Aromatic polyols are reaction products of aromatic polyhydroxy compounds such as hydroquinone, bisphenol A, bisphenol F, dihydroxynaphthalene, etc., for example, with epoxides such as ethylene oxide or propylene oxide, for example. As polyols it is also possible for ether diols to be present, i.e. oligomers and/or polymers, based for example on ethylene glycol, propylene glycol or butane-1,4-diol. Particular preference is given to linear aliphatic glycols.

Besides polyols and dicarboxylic acids it is also possible to use lactones for the synthesis of the copolyesters.

The copolyesters of the invention with amounts of unsaturated aliphatic dicarboxylic acids between 0.1 mol % and 20 mol %, preferably between 1 mol % and 10 mol % and with very particular preference between 2 mol % and 8 mol %, based on the total amount of polycarboxylic acids used, are prepared by means of established techniques for (poly) condensation reactions. They can be obtained, for example, by condensing polyols and polycarboxylic acids or their esters, anhydrides or acid chlorides in an inert gas atmosphere at temperatures from 100 to 260° C., preferably from 130 to 240° C., in the melt or in an azeotropic procedure, as described, for example, in Methoden der Organischen Chemie (Houben-Weyl), Vol. 14/2, 1-5, 21-23, 40-44, Georg Thieme Verlag, Stuttgart, 1963; in C. R. Martens, Alkyd Resins, 51-59, Reinhold Plastics Appl., Series, Reinhold Publishing Comp., New York, 1961; or in DE 27 35 497 and 30 04 903.

The amounts used of polymer type A before the grafting reaction in the mixture of the invention are between 10% and 90%, preferably between 20% and 80% and with very particular preference between 25% and 60%, by weight.

The amounts of polymer type A present in the mixture of the invention after the reaction are between 1% and 80%, preferably between 1% and 60% and with very particular preference between 5% and 40%, by weight.

Polymer Type B

Polymer type B may come about as a by-product in the synthesis of the graft copolymer AB. The composition of the B chains in the product constituent AB likewise corresponds to the following description:

The (meth)acrylate homopolymer and/or copolymer is composed by definition of polyacrylate and/or polymethacrylate sequences.

The poly(meth)acrylate is composed to an extent generally of more than 50% by weight, preferably of 80% to 100% by weight, of monomers of the formula I

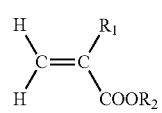

I in which $R_1$ is hydrogen or methyl and $R_2$ is an alkyl radical, an aliphatic or aromatic radical having 1 to 30 carbon atoms, preferably 1 to 20 carbon atoms.

Further possible units in the poly(meth)acrylate may include the following:

monomers of the formula II

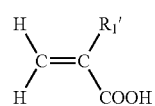

II in which R'$_1$ is hydrogen or methyl, and/or polymerizable acid anhydrides and/or monomers of the formula III

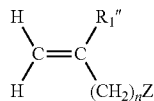

in which R"$_1$ is hydrogen or methyl and Z is a radical —C(O)R$_3$, a radical —OC(O)R$_3$, a radical —OR$_4$ or a chlorine atom and in which R$_3$ and R$_4$ are each an unbranched or branched alkyl radical having 1 to 20 carbon atoms or a phenyl radical and n is 0 or 1, and/or monomers of the formula IV

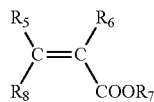

in which R$_5$ and R$_6$ are hydrogen or a radical —COOR'$_7$, R$_6$, hydrogen or a radical —CH$_2$COOR"$_7$, with the proviso that the compound of the formula IV must contain two carboxyl-containing groups, and in which R$_7$, R'$_7$ and R"$_7$ are hydrogen or an unbranched or branched alkyl radical having 1 to 20 carbon atoms or phenyl. The poly(meth)acrylate may if desired also contain fractions of the monomers of the formula V

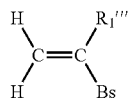

in which R'''$_1$ possesses the definition of R$_1$ and Bs is a nitrogen-containing functional radical such as a —CN group, a group —CONR$_9$R$_{10}$ in which R$_9$ and R$_{10}$ independently of one another are each hydrogen or an alkyl radical having 1 to 20 carbon atoms, or in which R$_9$ and R$_{10}$, with incorporation of the nitrogen, form a heterocyclic 5- or 6-membered ring, or in which Bs is an (inert) heterocyclic radical, more particularly a pyridine, pyrrolidine, imidazole, carbazole or lactam radical or alkylated derivatives thereof, or Bs possesses the definition —CH$_2$OH, or in which Bs possesses the definition in which Q is an unsubstituted or alkyl-substituted alkylene radical having 2 to 8 carbon atoms and R$_{11}$ is —OH, is —OR'''$_7$ or is a radical —NR'$_9$R'$_{10}$, where R'''$_7$, R'$_9$ and R'$_{10}$ possess the same definitions as R$_7$, R$_8$ and R$_9$, for example forming, together with the nitrogen atom, if desired with incorporation of a further heteroatom, a five- to six-membered heterocyclic ring.

The poly(meth)acrylate may if desired also contain fractions of the monomers of the formula VI

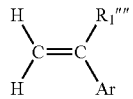

in which R''''$_1$ possesses the definition of R$_1$ and Ar is an aromatic. This aromatic may consist of one or more rings and may carry alkyl groups and/or functional groups.

Examples of the monomers of the formula I are methyl methacrylate, ethyl methacrylate, propyl methacrylate, butyl methacrylate, isobutyl methacrylate, ethylhexyl methacrylate, methyl acrylate, ethyl acrylate, propyl acrylate, butyl acrylate and isobutyl acrylate. The monomers of the formula I are also referred to as standard (meth)acrylates.

Examples of the monomers of the formula II are acrylic acid and methacrylic acid.

Examples of monomers of the formulae III and IV include, in particular, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleate, dilauryl maleate and dibutyl itaconate. Monomers of the formula V include C- and N-vinylpyridine and also vinylpyrrolidine, vinylpyrrolidone, vinylcarbazole, vinylimidazole and the alkyl derivatives thereof, more particularly the N-vinyl compounds, and also the hydroxyalkyl and dialkylaminoalkyl esters of acrylic and/or methacrylic acid, especially dimethylamino-ethyl(meth)acrylate, dimethylaminopropyl(meth)acrylate or hydroxyethyl(meth)acrylate. The (meth)acrylate describes both esters of acrylic acid and esters of methacrylic acid. Examples of monomers of the formula VI include, in particular, styrene and methylstyrenes. The proportion of the monomers of the formula II-VI in the polymer B is generally between 0% and 50%, preferably 0% to 20%, by weight (based on the monomers of the polymer B). The proportion of the monomers of the formulae II and/or IV and/or V in the poly(meth)acrylate will generally not exceed 20% by weight, and in general is 0% to 10%, preferably 0% to 5%, by weight.

In one preferred embodiment there are no monomers of the formula V present, and with more particular preference no monomers with hydroxyl-containing alkyl radicals are used.

Such alkyl radicals lead to hydroxyl groups in the side chain, which may possibly reduce the processing stability of reactive hotmelt adhesives.

Preferably there are no monomers of the formula VI present, i.e., with more particular preference, no styrene or styrene derivatives are used. Unpolymerized styrene monomers may evaporate from the adhesive and result in a strong odour nuisance and in increased fogging levels.

The poly(meth)acrylates used in accordance with the invention may be prepared by means of bulk, emulsion, suspension, minisuspension or microsuspension or solution polymerization.

The polymerization may also take place with the use of a regulator. These regulators may be, for example, mercaptans such as n-dodecyl mercaptan, thioglycolic acid, mercaptoethanol or ethylhexyl mercaptan.

The amounts of monomers used in the mixture of the invention that form polymer type B in the polymerization are between 10% and 90%, preferably between 20% and 80% and with very particular preference between 40% and 75%, by weight.

The amounts of polymer type B present in the mixture of the invention after the reaction are between 1% and 80%, preferably between 1% and 60% and with very particular preference between 5% and 40%, by weight.

In one particular embodiment the monomers used in the mixture of the invention that form polymer type B in the polymerization are selected from the group consisting of methyl(meth)acrylate, ethyl(meth)acrylate, propyl(meth)acrylate, butyl(meth)acrylate and ethylhexyl(meth)acrylate.

Polymer Type AB
Preparation of Graft Copolymers AB

A feature of the process for preparing a graft copolymer AB used in accordance with the invention is that, through reaction of a suitable initiator, described later on below, with double bonds of repeating units of unsaturated aliphatic dicarboxylic acids, two or more reactive (radical) centres for a free-radical polymerization of (meth)acrylates are formed in the polymer of type A. These reactive centres may be formed simultaneously or else with a time offset. Hence it is possible for double bonds in the polyester to be activated only after the free radicals formed at other double bonds in the polyester have been deactivated by termination reactions. Preferably, therefore, the polymer A is introduced with the initiator and this initial charge is heated for a time between 10 min and 60 min, before one or more of the above-described monomers I-VI for the formation of type B is or are added. Alternatively it is possible to introduce the polymers of type A and the monomers I-VI for forming type B together as an initial charge before the polymerization is initiated.

The graft polymer AB is generally prepared by grafting component B onto component A under the reaction conditions suitable for this purpose. Polymer type AB comprises a graft copolymer with polyester main chains and poly(meth) acrylate side chains.

This is done by preparing a 10%-50%, preferably 20%-30%, by weight solution of the polyester of the invention containing repeating units of unsaturated aliphatic dicarboxylic acids in a suitable solvent which is inert under polymerization conditions and which normally possesses a boiling point above the process temperature. Solvents used are the conventional solvents for solution polymerizations that are suitable for the corresponding esters. Suitability is hence possessed, for example, by acetic esters such as ethyl, propyl or butyl acetate, aliphatic solvents such as isooctane, cycloaliphatic solvents such as cyclohexane and carbonylic solvents such as butanone.

The polyester solutions are admixed with the monomers of the formula I and, where appropriate, the other monomers II-VI in the stated proportions and the resulting batch is polymerized with addition of one or more free-radical initiators, preferably peroxidic free-radical initiators, at temperatures from −10° C. to 100° C., commonly within 4-8 hours. The aim is for a conversion as near to complete as possible. Preference is given to using azo compounds such as AIBN or peresters such as tert-butyl peroctoate as free-radical initiator. The concentration of initiator is guided by the number of grafting sites desired and by the molecular weight desired for the segment B. In general the concentration of initiator is between 0.1% and 3% by weight, based on the polymer.

If desired it is possible to use regulators as well in order to set the desired molecular weight of the segments B. Examples of suitable regulators include sulphur regulators, more particularly regulators containing mercapto groups, dodecyl mercaptan for example. The concentrations of regulators are generally 0.1% to 1.0% by weight, based on the overall polymer.

Besides the method of solution polymerization described, the graft copolymers of type AB may also be synthesized by suspension polymerization, emulsion polymerization, miniemulsion or microemulsion polymerization or bulk polymerization.

In the case of bulk polymerization, for example, the polyesters are dissolved in the (meth)acrylic monomer mixture prior to the initiation of the free-radical polymerization.

Alternatively it is also possible to introduce free-radical initiator in a melt of the polyester and then to add the monomer mixture to this initial charge.

The amounts of polymer type AB after the grafting reaction in the mixture used in accordance with the invention are between 10% and 98% by weight, preferably between 20% and 70% by weight and with very particular preference between 30% and 60% by weight, based on the total mass of polymer types A, B, and AB.

The average fraction of the poly(meth)acrylates in the polymer fraction of the total mixture is between 10% and 90% by weight, preferably between 20% and 80% by weight and with very particular preference between 40% and 75% by weight. These figures are based on the sum of the poly(meth) acrylates of type B and the poly(meth)acrylate fractions in the graft copolymers of type AB.

The mixture of polymer types A, B and AB may have a weight-average molecular weight $M_w$ of between 5000 and 100 000, preferably between 7500 and 80 000 and with very particular preference between 10 000 and 60 000. The weight-average molecular weight $M_w$ is determined by means of gel permeation chromatography using IR detection in accordance with DIN 55672-1 with tetrahydrofuran as eluent.

The mixture of polymer types A, B and AB preferably has a hydroxyl number (OH number) of 0.5 to 150 mg KOH/g, preferably 1 to 80 mg KOH/g and more preferably 2 to 50 mg KOH/g.

The hydroxyl number is determined in accordance with DIN 53240-2.

Surprisingly it has been found that polymer type AB is an outstanding compatibilizer between poly(meth)acrylates and polyesters. The improvement in compatibility between poly (meth)acrylates and polyesters leads to new adhesives, more particularly hotmelt adhesives having positive improvements in properties. The hotmelt adhesives combine a high initial strength with an adjustable, long open time. They further possess good processing stability and stability of viscosity in the melt. The adhesives are elastic and have a high cohesion, thermal stability and solvent resistance. They exhibit broad-spectrum adhesion to a multiplicity of substrates.

The present invention further provides adhesives containing mixtures of polymers A, B and AB, polymer type A being a copolyester prepared with cocondensation of unsaturated aliphatic dicarboxylic acids, preferably itaconic acid, polymer type B being a (meth)acrylate homopolymer and/or copolymer, and polymer type AB being a graft copolymer of polymer type A and polymer type B. In principle the adhesives of the invention may be any kind of adhesives known to the person skilled in the art; more particularly they are hotmelt adhesives. With very particular preference the hotmelt adhesives are reactive hotmelt adhesives (reactive hotmelts, RHM), more particularly moisture-crosslinking hotmelt adhesives.

The moisture-crosslinking hotmelt adhesives of the invention more particularly further contain isocyanates and/or polyisocyanates. In the preferred adhesives the OH:NCO ratio of OH-containing components to isocyanate and/or polyisocyanate is 1:1.2 to 1:15, preferably from 1:1.4 to 1:3.

OH-containing component in this context refers not only to the mixtures of the invention but also to all constituents of the adhesive having OH groups.

The polyisocyanates may be difunctional and/or polyfunctional, aromatic, aliphatic and/or cyclo-aliphatic isocyanates. Aromatic polyisocyanates are particularly preferred. Examples of polyisocyanates are diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate and mixtures thereof. More particularly the polyisocyanate comprises diphenylmethane 4,4'-diisocyanate and mixtures of diphenylmethane 4,4'-diisocyanate and diphenylmethane 2,4'-diisocyanate.

In the reactive hotmelts the proportion of the mixtures of the invention containing polyester-graft-polyacrylates is 1%-99%, preferably 1%-70% and with very particular preference 1%-50%, by weight.

In preferred embodiments the hotmelt adhesives contain not only the mixtures containing polyester-graft-polyacrylates that are used in accordance with the invention but also other polyols, which include polyester polyols, polyether polyols and arbitrary hydroxyl-functional components.

The admixed polyester polyols may be liquid and/or solid, amorphous and/or (partially) crystalline polyesters of any desired structure, having molecular weights Mn between 1000 g/mol and 30 000 g/mol, preferably between 2000 g/mol and 10 000 g/mol (calculated from the hydroxyl number), preference being given to the use of linear polyester polyols. The admixed polyether polyols are polyether diols and polyether triols. Examples thereof are homopolymers and copolymers of ethylene glycol, propylene glycol and butane-1,4-diol. The molecular weight Mn of the admixed polyether polyols ought to be within a range from 200 g/mol to 10 000 g/mol, preferably between 400 g/mol and 6000 g/mol.

Examples of arbitrary hydroxyl-functional components are functionalized (H-acidic), thermoplastic polyurethanes (TPU) and/or polyacrylates and/or ethylene-vinyl acetate copolymers (EVA).

The hotmelt adhesives of the invention may contain up to 50% by weight of further additions. These additions may include the following: non-functionalized polymers, e.g. thermoplastic polyurethanes (TPU) and/or polyacrylates and/or ethylene-vinyl acetate copolymers (EVA); pigments and/or fillers, examples being talc, silicon dioxide, titanium dioxide, barium sulphate, calcium carbonate, carbon black or coloured pigments; tackifiers, such as rosins, hydrocarbon resins and phenolic resins, for example; and/or ageing inhibitors and auxiliaries.

The adhesives of the invention are easy to prepare. Where, in accordance with one preferred embodiment, further components are employed with the mixture used in accordance with the invention, the preparation of the adhesive is accomplished most simply by mixing the mixture and the additional components. Mixing may take place with or without solvent, preferably without solvent, and very preferably in the melt. Mixing may take place, for example, in a stirred vessel, a kneading apparatus or an extruder. The melting temperature is guided by the viscosity of the constituents. It is situated typically within a range from 100 to 180° C.

The adhesives of the invention are especially suitable for producing adhesive bonds and sealants. More particularly the hotmelt adhesives of the invention are suitable for bonding a multiplicity of substrates, more particularly for bonding metallic substrates, various plastics, wood, fibre composites, paper, textiles and leather. There are no limitations on the nature or extent of the adhesive bond. More particularly the adhesive bonds are bonds in the construction, wood and furniture industries, in window construction, in the automotive sector, in the textile industry, graphic industry, packaging industry and/or in the footwear industry.

Even without further remarks it is assumed that a person skilled in the art is able to utilize the above description in its widest extent. Consequently the preferred embodiments and examples are to be interpreted merely as a descriptive disclosure which in no way has any limiting effect whatsoever.

The present invention is illustrated in more detail below with reference to examples. Alternative embodiments of the present invention are obtainable in similar ways.

EXAMPLES

Preparation of the Inventive Copolyesters (Polymer Type A)

Comparative Example C1

Isophthalic acid (434 g, 2.6 mol), terephthalic acid (290 g, 1.7 mol), monoethylene glycol (120 g, 1.9 mol), neopentyl glycol (129 g, 1.2 mol) and hexane-1,6-diol (211 g, 1.8 mol) are melted in a stream of nitrogen in a 2 l flask with column and top-mounted distillation attachment. When a temperature of 170° C. is reached, water begins to be distilled off. Over the course of two hours the temperature is raised successively to 240° C. After about four more hours at this temperature, the elimination of water slows down. 150 mg of titanium tetrabutoxide are incorporated with stirring, and operation continues under reduced pressure, which is adapted in the course of reaction so that distillate continues to be obtained. When the desired hydroxyl and acid number ranges have been reached, reaction is discontinued. Characteristics of polyester C1 are shown in Table 1.

Inventive Example 1

Isophthalic acid (453 g, 2.73 mol), terephthalic acid (216 g, 1.30 mol), monoethylene glycol (130 g, 2.1 mol), neopentyl glycol (190 g, 1.83 mol) and hexane-1,6-diol (154 g, 1.31 mol) are melted in a stream of nitrogen in a 2 l flask with column and top-mounted distillation attachment. When a temperature of 180° C. is reached, water begins to be distilled off. Over the course of two hours the temperature is raised successively to 240° C. After about four more hours at this temperature, the elimination of water slows down. The temperature is reduced to 215° C. Then itaconic acid (40 g, 0.31 mol) and 100 mg of MEHQ are incorporated by stirring for one hour. Subsequently 300 mg of Tegokat 129 are incorporated with stirring, and operation continues under reduced pressure, which is adapted in the course of reaction so that distillate continues to be obtained. When the desired hydroxyl and acid number ranges have been reached, reaction is discontinued. Characteristics of polyester 1 are shown in Table 1.

Inventive Example 2

Adipic acid (577 g, 3.95 mol), itaconic acid (39 g, 0.30 mol), hexane-1,6-diol (546 g, 4.63 mol) and 100 mg of MEHQ are melted in a stream of nitrogen in a 2 l flask with column and top-mounted distillation attachment. When a temperature of 160° C. is reached, water begins to be distilled off. Over the course of two hours the temperature is raised successively to 215° C. After about three more hours at this temperature, the elimination of water slows down. 300 mg of Tegokat 129 are incorporated with stirring, and operation continues under reduced pressure, which is adapted in the course of reaction so that distillate continues to be obtained. When the desired hydroxyl and acid number ranges have been reached, reaction is discontinued. Characteristics of polyester 2 are shown in Table 1.

Inventive Example 3

Isophthalic acid (464 g, 2.80 mol), terephthalic acid (221 g, 1.33 mol), monoethylene glycol (127 g, 2.05 mol), neopentyl glycol (186 g, 1.78 mol) and hexane-1,6-diol (150 g, 1.27 mol) are melted in a stream of nitrogen in a 2 l flask with column and top-mounted distillation attachment. When a temperature of 185° C. is reached, water begins to be distilled off. Over the course of two hours the temperature is raised successively to 245° C. After about three more hours at this temperature, the elimination of water slows down. The temperature is reduced to 215° C. Then itaconic acid (41 g, 0.31 mol) and 500 mg of MEHQ are incorporated by stirring for one hour. Subsequently 300 mg of Tegokat 129 are incorporated with stirring, and operation continues under reduced pressure, which is adapted in the course of reaction so that distillate continues to be obtained. When the desired hydroxyl and acid number ranges have been reached, reaction is discontinued. Characteristics of polyester 3 are shown in Table 1.

TABLE 1

Properties of polymer type A

| Example | ITA | OHN | AN | $M_w$ (UV) | PDI (UV) |
|---|---|---|---|---|---|
| C1 | 0 | 20 | 1.2 | 18 900 | 1.7 |
| 1 | 4.8 | 64 | 1.4 | 6400 | 1.6 |
| 2 | 4.6 | 36 | 1.2 | 13 600 | 1.8 |
| 3 | 3.2 | 37 | 1.3 | 10 700 | 1.8 |

ITA = amount of itaconate repeating units in the copolyester, based on the total polycarboxylic acid content, figure in mol %, measured by $^1$H NMR spectroscopy
OHN = hydroxyl number, figure in mg KOH/g, measured to DIN 53240-2
AN = acid number, figure in mg KOH/g, measured to DIN EN ISO 2114
$M_w$ (UV) = mass-average molar weight (GPC, UV detection), figure in g/mol
$M_n$ (UV) = number-average molar weight (GPC, UV detection), figure in g/mol
PDI (UV) = polydispersity index = $M_w$ (UV)/$M_n$ (UV), determined to DIN 55672-1 in tetrahydrofuran as eluent.
MEHQ = 4-methoxyphenol Tegokat 129=tin(II) octoate; product of Goldschmidt TIB Mannheim GmbH Preparation of Mixtures of Polymer Types A, B and AB Examples of Solution Polymerization Inventive Example 4

A jacketed vessel with attached thermostat, reflux condenser, blade stirrer and internal thermometer is charged with 25 g of propyl acetate and 13 g of polyester from Inventive Example 1. The polyester is dissolved completely at 85° C. with stirring and then 0.06 g of tert-butyl per-2-ethylhexanoate is added. In order to form an optimum yield of free radicals along the polyester chains, this solution is stirred at 85° C. over a period of 30 min before, using a metering pump, 12.8 g of methyl methacrylate, 6.4 g of n-butyl acrylate, 0.38 g of 2-ethylhexyl thioglycolate and a further 0.2 g of tert-butyl per-2-ethylhexanoate are metered in over the course of 3 h. Subsequently a further 0.15 g of tert-butyl per-2-ethylhexanoate is metered in over a period of 120 min. After a further 60 min at 85° C. and 60 min at 100° C., the polymer solution is cooled and dried by means of a rotary evaporator.

Inventive Example 5

Procedure the same as for Inventive Example 4, using 9.6 g of methyl methacrylate and 9.6 g of n-butyl acrylate instead of the amounts indicated therein.

Inventive Example 6

A jacketed vessel with attached thermostat, reflux condenser, blade stirrer and internal thermometer is charged with 33 g of propyl acetate and 12 g of polyester 1. The polyester is dissolved completely at 85° C. with stirring and then 0.08 g of tert-butyl per-2-ethylhexanoate is added. In order to form an optimum yield of free radicals along the polyester chains, this solution is stirred at 85° C. over a period of 30 min before, using a metering pump, 18.7 g of methyl methacrylate, 9.3 g of n-butyl acrylate, 0.56 g of 2-ethylhexyl thioglycolate and a further 0.25 g of tert-butyl per-2-ethylhexanoate are metered in over the course of 3 h. Subsequently a further 0.25 g of tert-butyl per-2-ethylhexanoate is metered in over a period of 120 min. After a further 60 min at 85° C. and 60 min at 100° C., the polymer solution is cooled and dried by means of a rotary evaporator.

Inventive Example 7

A jacketed vessel with attached thermostat, reflux condenser, blade stirrer and internal thermometer is charged with 25 g of propyl acetate and 13 g of polyester from Inventive Example 2. The polyester is dissolved completely at 85° C. with stirring and then 0.06 g of tert-butyl per-2-ethylhexanoate is added. In order to form an optimum yield of free radicals along the polyester chains, this solution is stirred at 85° C. over a period of 30 min before, using a metering pump, 12.8 g of n-butyl methacrylate, 6.4 g of ethylhexyl methacrylate, 0.38 g of 2-ethylhexyl thioglycolate and a further 0.2 g of tert-butyl per-2-ethylhexanoate are metered in over the course of 3 h. Subsequently a further 0.15 g of tert-butyl per-2-ethylhexanoate is metered in over a period of 120 min. After a further 60 min at 85° C. and 60 min at 100° C., the polymer solution is cooled. Finally the solvent is removed by means of a rotary evaporator.

The mixture has a melting point of 30° C., determined by the DSC method, $2^{nd}$ heating (DIN 53765).

Inventive Example 8

Procedure the same as for Inventive Example 6, using the polyester from Inventive Example 3 instead of the polyester from Inventive Example 1.

Comparative Example C2

Procedure the same as for Inventive Example 4, using the polyester from Comparative Example C1 instead of the polyester from Inventive Example 1.

Table 2 summarizes the results of the grafting experiments from Inventive Examples 4 to 8 and Comparative Example C2:

| Example | Starting polyester | | | Graft product (mixture) | | | | | |
|---|---|---|---|---|---|---|---|---|---|
| | No. | ITA | $M_w$ (UV) | $ITA_{graft}$ | $M_w$ (UV) | $M_w$ (RI) | PDI (RI) | OHN | Tg |
| C2 | C1 | 0 | 18 900 | 0 | 18 400 | 28 800 | 2.0 | 7 | 30/37 |
| 4 | 1 | 4.8 | 6400 | 0.5 | 20 000 | 28 500 | 4.7 | 21 | 27 |
| 5 | 1 | 4.8 | 6400 | 1.1 | 26 000 | 36 000 | 6.0 | 22 | 15 |

-continued

| Example | No. | ITA | Starting polyester $M_w$ (UV) | $ITA_{graft}$ | $M_w$ (UV) | Graft product (mixture) $M_w$ (RI) | PDI (RI) | OHN | Tg |
|---|---|---|---|---|---|---|---|---|---|
| 6 | 1 | 4.8 | 6400 | 0.4 | 17 000 | 25 500 | 2.5 | 17 | 22 |
| 7 | 2 | 4.6 | 13 600 | 0.2 | 30 500 | 31 100 | 3.0 | 13 | |
| 8 | 3 | 3.2 | 10 700 | 0.3 | 43 800 | 44 300 | 4.0 | 12 | 35 |

$ITA_{graft}$ = amount of itaconate repeating units in the copolyester (block) of the graft product, based on its total polycarboxylic acid content, figure in mol %, measured by $^1$H NMR spectroscopy
$M_w$ (RI) = mass-average molar weight (GPC, RI detection), figure in g/mol
$M_n$ (RI) = number-average molar weight (GPC, RI detection), figure in g/mol
PDI (RI) = polydispersity index = $M_w$ (RI)/$M_n$ (RI), determined to DIN 55672-1 using tetrahydrofuran as eluent.
OHN = hydroxyl number, figure in mg KOH/g, determined to DIN 53240-2
Tg = glass transition temperature, figure in ° C., determined to DIN 53765

Preparation and Characterization of the Inventive Hotmelt Adhesives

The moisture-curing hotmelt adhesives (RHM) described in the examples below are characterized on the basis of their melt viscosity at 130° C. (Brookfield Thermosel, spindle No. 27), the increase in viscosity after 24 h storage in a cartridge, their open time and setting time, the visual assessment of the melt, and also their tensile strength and extension, in accordance with DIN 53504, of a 500 µm film cured for 7 days at 20° C. and 65% relative humidity.

For the determination of the open time, a film of the hot adhesive melt at 130° C. is applied in a thickness of 0.5 mm. Strips of an open-pored paper are pressed into the film as a function of the time. When the surface of the adhesive film is tack-free, the strips are removed. The open time is the point in time at which the paper strip is no longer sufficiently wetted and when fibre extraction is no longer observed.

For the determination of the setting time, the hot adhesive at 130° C. is applied thinly to one side of a wooden block with an area of 25 mm×25 mm and immediately joined to a second wooden block having the same base area. The setting time indicates for how long the pieces of wood can be displaced manually with respect to one another. The shorter this time span, the better the setting behaviour of the hotmelt.

Inventive Example RHM 1

In a 500 ml flask with ground joints, 33 parts by weight of the mixture from Inventive Example 4, 33 parts by weight of DYNACOLL 7231 and 33 parts by weight of DYNACOLL 7360 are melted at 140° C. Following drying under reduced pressure at 130° C., Lupranat ME is added in a molar OH/NCO ratio of 1/2.2 and the mixture is rapidly homogenized. For complete reaction of the reactants, the mixture is stirred under an inert gas atmosphere at 130° C. for 45 minutes. Subsequently the moisture-curing hotmelt adhesive is dispensed. The resulting hotmelt adhesive is cloudy in the melt and possesses a melt viscosity (130° C.) of 17 Pa·s. The increase in viscosity is 200%. The adhesive has an open time of 480 seconds and a setting time of 50 seconds. The tensile strength is 24 N/mm², the extension 780%.

Comparative Example RHM 2

The procedure is as for Inventive Example RHM 1, with the mixture from Inventive Example 4 being replaced by the mixture from Comparative Example C2. The resulting hotmelt adhesive contains gel particles, is inhomogeneous and separates into two phases. Further characterization is not possible.

A comparison of the two preceding examples shows the significantly improved compatibility of polyesters and polyacrylates when the inventive mixture is used.

Comparative Example RHM 3

In a 500 ml flask with ground joints, 24 parts by weight of Elvacite 2901 are melted at 180° C. Thereafter 44 parts by weight of Voranol 200 L and 18 parts by weight of DYNACOLL 7360 are added. The mixture is cooled to 130° C. and dried under reduced pressure. Lupranat ME is added in a molar OH/NCO ratio of 1/1.65 and the mixture is rapidly homogenized. For complete reaction of the reactants, the mixture is stirred under an inert gas atmosphere at 130° C. for 45 minutes. Subsequently the moisture-curing hotmelt adhesive is dispensed. The resulting hotmelt adhesive is transparent and possesses a melt viscosity (130° C.) of 10 Pa·s. The increase in viscosity is 340%. The adhesive has an open time of 460 seconds and a setting time of 150 seconds. The tensile strength is 9 N/mm², the extension 780%.

Inventive Examples RHM 4-10

The procedure is as for Inventive Example RHM 1, in accordance with the compositions specified in Table 3.

TABLE 3

Properties of the moisture-curable hotmelt adhesives

| RHM | 4 | 5 | 6 | 7 | 8 | 9 | 10 |
|---|---|---|---|---|---|---|---|
| Composition | | | | | | | |
| Polyester C1 | 33 | | | | | | |
| Mixture 4 | | 33 | | | | | |
| Mixture 5 | | | 33 | | | | |
| Mixture 6 | | | | 33 | | | |
| Mixture 7 | | | | | 33 | 20 | |
| Mixture 8 | | | | | | | 20 |
| DYNACOLL 7231 | 33 | 23 | 33 | 33 | 33 | | 33 |
| DYNACOLL 7250 | | | | | | 33 | |
| DYNACOLL 7360 | 33 | 23 | 33 | 33 | 33 | 46 | 46 |
| DYNACOLL 7380 | | 20 | | | | | |
| Lupranat ME, OH/NCO | 1/2.2 | 1/2.2 | 1/2.2 | 1/2.2 | 1/2.2 | 1/2.2 | 1/2.2 |
| RHM Properties | | | | | | | |
| Viscosity 130° C., Pa·s | 13 | 14 | 18 | 10 | 9 | 8 | 15 |
| Increase in viscosity, % | 160 | 200 | 210 | 230 | 140 | 160 | 220 |

TABLE 3-continued

Properties of the moisture-curable hotmelt adhesives

| RHM | 4 | 5 | 6 | 7 | 8 | 9 | 10 |
|---|---|---|---|---|---|---|---|
| Open time, sec | 600 | 150 | 720 | 600 | 270 | 300 | 330 |
| Setting time, sec | 720 | 25 | 70 | 100 | 70 | 70 | 80 |
| Appearance of melt | t | o | cl | cl | o | cl | t |
| Tensile strength, N/mm² | 35 | 30 | 23 | 20 | 15 | 17 | 21 |
| Extension, % | 310 | 660 | 940 | 800 | 1200 | 1150 | 860 | t = transparent, o = opaque, cl = cloudy
RHM 4 is a comparative example
Lupranat ME is a diphenylmethane 4,'-diisocyanate (MDI) from BASF
DYNACOLL 7231 is a liquid polyester from Degussa with Tg = −30° C. and hydroxyl number 20 mg KOH/g
DYNACOLL 7250 is a liquid polyester from Degussa with Tg = −50° C. and hydroxyl number 20 mg KOH/g
DYNACOLL 7360 is a crystalline polyester from Degussa with melting point 55° C. and hydroxyl number 30 mg KOH/g
DYNACOLL 7380 is a crystalline polyester from Degussa with melting point 70° C. and hydroxyl number 30 mg KOH/g
Elvacite 2901 is a hydroxyl-containing polyalkyl(meth)acrylate from Lucite, OH number 6 mg KOH/g
Voranol 2000 L is a polypropylene glycol having a molecular weight of approximately 2000 g/mol from Dow The examples show the significantly reduced setting time when using the mixtures of the invention, as compared with prior-art formulations based on polyester mixtures with a long open time. They also show the reduced setting time, the improved processing stability and cohesion when using the mixtures of the invention, as compared with prior-art formulations based on polyacrylates, polyethers and polyesters.

The invention claimed is:

1. A method of preparing an adhesive, comprising:
preparing
a polymer A of copolyester by cocondensating at least one unsaturated aliphatic dicarboxylic acid,
a polymer B of at least one of (meth)acrylate homopolymer and copolymer, and
a polymer AB which is graft copolymer of said polymer A and said polymer B, to obtain a mixture comprising polymers A, B and AB.

2. The method according to claim 1, wherein the unsaturated aliphatic dicarboxylic acid is selected from the group consisting of fumaric acid, maleic acid, itaconic acid and esterifiable derivatives thereof.

3. The method according to claim 1, wherein the unsaturated aliphatic dicarboxylic acid is itaconic acid.

4. The method according to claim 1, wherein the amount of polymer A is between 5% and 80% by weight, the amount of polymer B is between 5% and 80% by weight and the amount of polymer AB is between 10% and 98% by weight, based on the total mass of polymers A, B and AB.

5. The method according to claim 1, wherein the polymer A is a copolyester whose unsaturated aliphatic dicarboxylic acid content, based on the total amount of polycarboxylic acids used, is between 0.1 mol % and 20 mol %.

6. The method according to claim 1, wherein the mixture contains no styrene or styrene derivative.

7. The method according to claim 1, wherein the polymer AB comprises a graft copolymer comprising a polyester main chain and a poly(meth)acrylate side chain.

8. The method according to claim 1, wherein the average fraction of the poly(meth)acrylate fractions in the total mixture is between 10% and 90% by weight.

9. An adhesive, comprising:
a mixture of polymers A, B and AB,
wherein the polymer A is a copolyester prepared by a process comprising cocondensating an unsaturated aliphatic dicarboxylic acid, the polymer B is at least one of (meth)acrylate homopolymer and copolymer, and the polymer AB is a graft copolymer of said polymer A and said polymer B.

10. The adhesive according to claim 9, wherein the unsaturated aliphatic dicarboxylic acid is itaconic acid.

11. The adhesive according to claim 9, wherein the adhesive is a hotmelt adhesive.

12. The adhesive according to claim 9, further comprising at least one of isocyanates and polyisocyanates.

13. The adhesive according to claim 9, further comprising at least one member selected from the group consisting of other polyols, non-functionalized polymers, pigments, fillers, tackifiers, ageing inhibitors and auxiliaries.

14. A sealant comprising the adhesive according to claim 9.

15. An adhesive bond comprising the adhesive according to claim 9.

* * * * *